(12) United States Patent
Kim et al.

(10) Patent No.: US 11,407,847 B2
(45) Date of Patent: Aug. 9, 2022

(54) METHOD OF PREPARING COPOLYMER

(71) Applicant: LG CHEM, LTD., Seoul (KR)

(72) Inventors: In Soo Kim, Daejeon (KR); Min Cheol Ju, Daejeon (KR); Min Seung Shin, Daejeon (KR); Sung Won Hong, Daejeon (KR); Hyung Sub Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 589 days.

(21) Appl. No.: 16/469,546

(22) PCT Filed: Dec. 19, 2018

(86) PCT No.: PCT/KR2018/016230
§ 371 (c)(1),
(2) Date: Jun. 13, 2019

(87) PCT Pub. No.: WO2019/225827
PCT Pub. Date: Nov. 28, 2019

(65) Prior Publication Data
US 2021/0403621 A1 Dec. 30, 2021

(30) Foreign Application Priority Data
May 25, 2018 (KR) .......... 10-2018-0059821
Dec. 17, 2018 (KR) .......... 10-2018-0163425

(51) Int. Cl.
*C08F 212/10* (2006.01)
*C08F 2/00* (2006.01)
*C08F 2/18* (2006.01)

(52) U.S. Cl.
CPC ............ *C08F 212/10* (2013.01); *C08F 2/001* (2013.01); *C08F 2/18* (2013.01); *C08F 2400/02* (2013.01)

(58) Field of Classification Search
CPC ...... C08F 212/10; C08F 2400/02; C08F 2/18; C08F 2/001
See application file for complete search history.

(56) References Cited

U.S. PATENT DOCUMENTS 3,763,278 A * 10/1973 Griffith ................ C08F 220/44
525/51
4,713,429 A 12/1987 Ikuma
(Continued)

FOREIGN PATENT DOCUMENTS

JP        03258804 A  * 11/1991
JP        H03258804 A    11/1991
(Continued)

OTHER PUBLICATIONS

Search Report dated Mar. 30, 2020 for European Application No. 18882281.1.

*Primary Examiner* — Ling Siu Choi
*Assistant Examiner* — David L Miller (57) ABSTRACT

Provided is a method of preparing a copolymer which includes 1) initiating polymerization by batch-adding an aromatic vinyl-based monomer and a vinyl cyan-based monomer to a reactor; and 2) performing polymerization by continuously adding an aromatic vinyl-based monomer to the reactor at a predetermined rate after the initiation of polymerization, wherein the continuous addition of the aromatic vinyl-based monomer is initiated when a polymerization conversion rate is 10% or less and terminated when a polymerization conversion rate is between 80 and 90%, and step 2) includes a first temperature phase and a second temperature phase, each of which maintains a constant temperature, wherein a temperature of the second temperature phase is higher than that of the first temperature phase, and thereby a copolymer with a small standard deviation for (Continued)

a vinyl cyan-based unit composition and excellent transparency may be prepared.

11 Claims, 1 Drawing Sheet

(56) References Cited

U.S. PATENT DOCUMENTS

| | | | | |
|---|---|---|---|---|
| 5,618,901 | A | * | 4/1997 | Smierciak ............ C08F 220/44 526/342 |
| 6,100,001 | A | * | 8/2000 | Someda .................. G03G 9/10 430/111.1 |
| 6,391,984 | B1 | | 5/2002 | Grolitzer et al. |

FOREIGN PATENT DOCUMENTS

| | | |
|---|---|---|
| JP | H0699529 A | 12/1994 |
| JP | H075685 B2 | 1/1995 |
| KR | 19980022891 A | 7/1998 |
| KR | 100191420 B1 | 6/1999 |
| KR | 20090075486 A | 7/2009 |
| KR | 100983702 B1 | 9/2010 |
| KR | 20160073005 A | 6/2016 |
| KR | 20170076272 A | 7/2017 |
| KR | 20180024350 A | 3/2018 |

* cited by examiner

METHOD OF PREPARING COPOLYMER

TECHNICAL FIELD

Cross-Reference to Related Application

This application is a National Phase of International Application No. PCT/KR2018/016230 filed on Dec. 19, 2018, which claims priority to and the benefit of Korean Patent Application No. 10-2018-0059821, filed on May 25, 2018, and Korean Patent Application No. 10-2018-0163425, filed on Dec. 17, 2018, the disclosures of which are incorporated herein by reference in their entirety.

TECHNICAL FIELD

The present invention relates to a method of preparing a copolymer, and particularly, to a method of preparing a copolymer, in which the point of time to initiate and terminate the continuous addition of an aromatic vinyl-based monomer and the temperature condition of the continuous addition are adjusted.

BACKGROUND ART

A copolymer including units derived from a styrene and units derived from an acrylonitrile can be prepared by a method such as emulsion polymerization, suspension polymerization, bulk polymerization, etc., and, in particular, suspension polymerization is favorable in terms of use of a small amount of additive, a relatively simple post-treatment process, and high production efficiency. Accordingly, it is possible to respond quickly to a requirement of a small amount of copolymers of various types.

Since acrylonitrile used in the preparation of a copolymer is slightly water-soluble, only a small amount thereof can be dissolved in water, which is a medium, at the early stage of polymerization. Therefore, a small amount of acrylonitrile is involved in the early stage of polymerization, and an amount of acrylonitrile that is involved in polymerization gradually increases as polymerization proceeds, resulting in a difference in the composition of a monomer in the polymerization system. Accordingly, the contents of components in the copolymer vary depending on the time of polymerization, and thus the polymer thus prepared has an inconsistent composition and exhibits degradation of properties and color characteristics.

DISCLOSURE

Technical Problem

The present invention is directed to providing a method of preparing a copolymer, which is capable of preparing a copolymer having a consistent composition throughout polymerization.

Technical Solution

According to an embodiment of the present invention, there is provided a method of preparing a copolymer which includes 1) initiating polymerization by batch-adding an aromatic vinyl-based monomer and a vinyl cyan-based monomer to a reactor; and 2) performing polymerization by continuously adding an aromatic vinyl-based monomer to the reactor at a predetermined rate after the initiation of polymerization, wherein the continuous addition of the aromatic vinyl-based monomer is initiated when a polymerization conversion rate is 10% or less and terminated when a polymerization conversion rate is between 80 and 90%, and step 2) includes a first temperature phase and a second temperature phase, each of which maintains a constant temperature, wherein a temperature of the second temperature phase is higher than that of the first temperature phase.

Advantageous Effects

A method of preparing a copolymer according to the present invention can implement a copolymer that has a consistent composition throughout polymerization and exhibits transparency and a high polymerization conversion rate.

In addition, a method of preparing a copolymer according to the present invention can implement the manufacture of a thermoplastic resin molded article having smooth surface characteristics.

MODE FOR INVENTION

Hereinafter, the present invention will be described in more detail to promote understanding of the present invention.

Terms and words used in this specification and claims should not be interpreted as limited to commonly used meanings or meanings in dictionaries, and they should be interpreted with meanings and concepts which are consistent with the technological scope of the invention based on the principle that the inventors have appropriately defined concepts of terms in order to describe the invention in the best way.

In the present invention, a polymerization conversion rate represents a degree at which monomers are polymerized to form a polymer, and it may be calculated by the following equation.

$$\text{Polymerization conversion rate (\%)} = (\text{Total amount of initially added monomers} - \text{Total amount of unreacted monomers})/(\text{Total amount of initially added monomers}) \times 100$$

In the present invention, a weight average molecular weight may be measured as a relative value with respect to a standard polystyrene (PS) specimen through gel permeation chromatography (GPC; Waters Breeze) using tetrahydrofuran (THF) as an elution solvent.

1. Method of Preparing Copolymer

A method of preparing a copolymer according to an embodiment of the present invention includes 1) initiating polymerization by batch-adding an aromatic vinyl-based monomer and a vinyl cyan-based monomer to a reactor; and 2) performing polymerization by continuously adding an aromatic vinyl-based monomer to the reactor at a predetermined rate after the initiation of polymerization, wherein the continuous addition of the aromatic vinyl-based monomer is initiated when a polymerization conversion rate is 10% or less and terminated when a polymerization conversion rate is between 80 and 90%, and step 2) includes a first temperature phase and a second temperature phase, each of which maintains a constant temperature, wherein a temperature of the second temperature phase is higher than that of the first temperature phase.

The method of preparing a copolymer according to an embodiment of the present invention may further include, after step 2), 3) terminating the polymerization when a polymerization conversion rate is 95% or more.

Hereinafter, each step of the method of preparing a copolymer according to an embodiment of the present invention will be described in detail.

Step 1)

First, an aromatic vinyl-based monomer and a vinyl cyan-based monomer are batch-added to a reactor to initiate polymerization.

The aromatic vinyl-based monomer may be one or more selected from the group consisting of styrene, α-methylstyrene, p-bromostyrene, p-methylstyrene, p-chlorostyrene, and o-bromostyrene, and, in particular, styrene is preferred.

The vinyl cyan-based monomer may be one or more selected from the group consisting of acrylonitrile, methacrylonitrile, ethacrylonitrile, phenylacrylonitrile, α-chloronitrile, α-chloroacrylonitrile, and α-cyanoethylacrylonitrile, and, in particular, acrylonitrile is preferred.

A weight ratio of the aromatic vinyl-based monomer and the vinyl cyan-based monomer which are added in the method of preparing a copolymer, specifically, a weight ratio of the total weight of the aromatic vinyl-based monomer and the vinyl cyan-based monomer which are added in the method of preparing a copolymer may be 80:20 to 60:40 or 75:25 to 65:35, and is preferably 75:25 to 65:35. When the weight ratio of the aromatic vinyl-based monomer and the vinyl cyan-based monomer falls within the above range, a copolymer with further improved heat resistance, chemical resistance, mechanical properties, and processability may be prepared.

One or more selected from the group consisting of an initiator, a suspending agent, a molecular weight controlling agent, and water may be further added to the reactor.

The initiator may be a radical initiator. The initiator is preferably a radical initiator with a 10-hour half-life temperature of 80 to 120° C., and, in consideration of manufacturing costs and a polymerization conversion rate, it is more preferably a mixture of a radical initiator with a 10-hour half-life temperature of 80 to 90° C. and a radical initiator with a 10-hour half-life temperature of 110 to 120° C.

The initiator may be one or more selected from the group consisting of 2,5-dimethyl-2,5-di(t-butylperoxy)hexane, di(t-butylperoxy-isopropyl)benzene, t-butyl cumyl peroxide, di-(t-amyl)-peroxide, dicumyl peroxide, butyl 4,4-di(t-butylperoxy)valerate, t-butyl peroxybenzoate, 2,2-di(t-butylperoxy)butane, t-amyl peroxy-benzoate, t-butyl peroxy-acetate, t-butylperoxy-(2-ethylhexyl) carbonate, t-butylperoxy isopropyl carbonate, t-butyl peroxy-3,5,5-trimethyl-hexanoate, 1,1-di(t-butylperoxy)cyclohexane, t-amyl peroxyacetate, t-amyl peroxy-(2-ethylhexyl) carbonate, 1,1-di(t-butylperoxy)-3,5,5-trimethylcyclohexane, 1,1-di(t-amyl peroxy)cyclohexane, t-butyl-monoperoxy-maleate, and 1,1'-azodi(hexahydrobenzonitrile), and, in particular, one or more selected from the group consisting of dicumyl peroxide, 1,1-di(t-butylperoxy)cyclohexane, and 1,1'-azobis(cyclohexanecarbonitrile) are preferred.

The initiator may be included in an amount of 0.01 to 0.5 part by weight, 0.03 to 0.45 part by weight, or 0.06 to 0.25 part by weight with respect to 100 parts by weight of the sum of the aromatic vinyl-based monomer and the vinyl cyan-based monomer, and is preferably included in an amount of 0.06 to 0.25 part by weight. When the content of the initiator falls within the above range, a polymerization conversion rate of the copolymer may be further increased.

The suspending agent may be one or more selected from the group consisting of water-soluble polyvinyl alcohol, partially saponified polyvinyl alcohol, polyacrylic acid, a copolymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzenesulfonate, and sodium dioctyl sulfosuccinate, and, in particular, tricalcium phosphate is preferred.

The suspending agent may be included in an amount of 0.5 to 2.0 parts by weight or 1.0 to 1.5 parts by weight with respect to 100 parts by weight of the sum of the aromatic vinyl-based monomer and the vinyl cyan-based monomer, and is preferably included in an amount of 1.0 to 1.5 parts by weight. When the content of the suspending agent falls within the above range, a particle size of the copolymer may be easily adjusted, and dispersion stability may be improved.

The molecular weight controlling agent may be one or more selected from the group consisting of an α-methyl styrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide, and, in particular, t-dodecyl mercaptan is preferred.

The molecular weight controlling agent may be included in an amount of 0.01 to 0.15 part by weight or 0.05 to 0.1 part by weight with respect to 100 parts by weight of the sum of the aromatic vinyl-based monomer and the vinyl cyan-based monomer, and is preferably included in an amount of 0.05 to 0.1 part by weight. When the content of the molecular weight controlling agent falls within the above range, a copolymer with an appropriate weight average molecular weight may be prepared.

In this case, the contents of the initiator, the suspending agent, and the molecular weight controlling agent are based on 100 parts by weight of the sum of the aromatic vinyl-based monomer and the vinyl cyan-based monomer which are added in the method of preparing a copolymer according to an embodiment of the present invention.

The water may be ion exchanged water or deionized water.

In step 1), an aromatic vinyl-based monomer and a vinyl cyan-based monomer are batch-added to a reactor, and polymerization is then initiated while raising a temperature inside the reactor.

The temperature inside the reactor may be raised to a temperature of a first temperature phase to be described below.

Step 2)

After the initiation of polymerization, an aromatic vinyl-based monomer is continuously added at a predetermined rate to perform polymerization.

In this case, the continuous addition of the aromatic vinyl-based monomer is initiated when a polymerization conversion rate is 10% or less and terminated when a polymerization conversion rate is between 80 and 90%.

The continuous addition of the aromatic vinyl-based monomer is preferably initiated when a polymerization conversion rate is between 1 and 10%, more preferably between 1 and 5%.

In addition, the continuous addition of the aromatic vinyl-based monomer is preferably terminated when a polymerization conversion rate is between 85 and 90%.

Since the vinyl cyan-based monomer is slightly water-soluble, in the case of suspension polymerization, as a polymerization time elapses, an amount of the vinyl cyan-based monomer that may be involved in the polymerization is gradually increased. Therefore, when the aromatic vinyl-based monomer is continuously added at a predetermined rate for a time period until the above-described polymerization conversion rate is reached, the composition of a vinyl cyan-based monomer and an aromatic vinyl-based monomer that may be involved in polymerization may be harmoniously implemented. As a result, a copolymer that has a consistent composition throughout polymerization and exhibits transparency may be prepared.

However, when the continuous addition of the aromatic vinyl-based monomer is initiated when a polymerization conversion rate is greater than 10% or terminated when a polymerization conversion rate is less than 80%, a difference between compositions of copolymers prepared at the early stage and late stage of polymerization significantly increases. Specifically, a copolymer prepared at the early stage of polymerization includes an excessive amount of an aromatic vinyl-based unit, and a copolymer prepared at the late stage of polymerization includes an excessive amount of a vinyl cyan-based unit. Therefore, a copolymer having a consistent composition throughout polymerization may not be prepared, and properties and color characteristics of a copolymer may be significantly degraded.

In addition, when the continuous addition of the aromatic vinyl-based monomer is terminated when a polymerization conversion rate is greater than 90%, it leads to the addition of the aromatic vinyl-based monomer during an aging process, and thus a difference between compositions of a copolymer prepared until a polymerization conversion rate reaches 80 to 90% and a copolymer prepared when a polymerization conversion rate is greater than 90% significantly increases, thereby a copolymer having a consistent composition throughout polymerization may not be prepared. In addition, since most of the copolymerization has been terminated at the time point where a polymerization conversion rate starts to exceed 90%, an aromatic vinyl-based monomer added when a polymerization conversion rate is greater than 90% is not involved in polymerization or may be self-polymerized by heat to form an oligomer. In this case, the unreacted monomer and the oligomer serve as foreign substances, only to degrade transparency of a copolymer.

Alternatively, when the aromatic vinyl-based monomer is batch-added, a copolymer including an increasing proportion of a vinyl cyan-based unit as polymerization proceeds is prepared. Therefore, a copolymer having a consistent composition throughout polymerization may not be prepared.

Meanwhile, step 2) includes a first temperature phase and a second temperature phase, each of which maintains a constant temperature. In addition, a temperature of the second temperature phase is higher than that of the first temperature phase.

Specifically, step 2) may proceed by continuously adding an aromatic vinyl-based monomer at a predetermined rate in the first temperature phase to perform polymerization and then continuously adding an aromatic vinyl-based monomer at a predetermined rate in the second temperature phase to perform polymerization.

When step 2) includes the first temperature phase and the second temperature phase, the vinyl cyan-based monomers that have not been reacted and polymerized in the first temperature phase are polymerized together with an aromatic vinyl-based monomer in the second temperature phase, and thus a polymerization conversion rate is significantly increased. Therefore, a copolymer that has a consistent composition throughout polymerization and exhibits transparency may be prepared.

When the continuous addition is carried out only in the first temperature phase, where temperature is low, and not carried out in the second temperature phase, a large amount of a vinyl cyan-based monomer remains unreacted, and thus not only a copolymer with an inconsistent composition is prepared but also a polymerization conversion rate is significantly degraded. Also, even when a temperature is raised to that of the second temperature phase after the continuous addition is terminated, the vinyl cyan-based monomers react with each other in the second temperature phase, and thus a copolymer with an inconsistent composition is prepared.

In addition, when the continuous addition is carried out only in the second temperature phase, where temperature is high, and not carried out in the first temperature phase, the reaction between the aromatic vinyl-based monomer and the vinyl cyan-based monomer proceeds normally at the early and late stages of polymerization, but the amount of vinyl cyan-based monomers reacting with each other increases at the middle stage of polymerization. Therefore, not only a copolymer having an inconsistent composition throughout polymerization is prepared, but also a polymerization conversion rate may be degraded due to an increase in amount of an unreacted monomer.

Additionally, when step 2) is performed while raising a temperature to a predetermined temperature, polymerization may proceed quickly while there is a large amount of acrylonitrile contained in a reactor at the early stage of polymerization, and polymerization may proceed while there is a small amount of acrylonitrile contained in the reactor at the late stage of polymerization. Consequently, a copolymer with a small standard deviation for acrylonitrile and excellent transparency may not be prepared.

A temperature of the first temperature phase may be 90 to 110° C. or 95 to 105° C., and is preferably 95 to 105° C. When the temperature of the first temperature phase falls within the above range, a polymerization conversion rate of the copolymer may increase, and efficiency of the initiator may also be enhanced. Also, an excessive increase in manufacturing costs may be prevented.

A temperature of the second temperature phase may be 120 to 140° C. or 125 to 135° C., and is preferably 125 to 135° C. When the temperature of the second temperature phase falls within the above range, unreacted monomers in the first temperature phase may be more easily polymerized.

A ratio of the duration of the first temperature phase and the duration of the second temperature phase may be 55:45 to 95:5 or 70:30 to 90:10, and is preferably 70:30 to 90:10. When the ratio of the duration of the first temperature phase and the duration of the second temperature phase falls within the above range, manufacturing costs may not excessively increase, a polymerization conversion rate may significantly increase, and a copolymer having a consistent composition throughout polymerization may be prepared.

Step 2) may further include a temperature rising section configured to raise a temperature from the first temperature of the first temperature phase to the second temperature of the second temperature phase. The duration of the temperature rising section may vary depending on the type of a reactor and the content of a polymer, and thus is not particularly limited.

A weight ratio of the batch-added aromatic vinyl-based monomer and the continuously added aromatic vinyl-based monomer may be 85:15 to 50:50, 70:30 to 50:50, or 65:35 to 55:45, and is preferably 65:35 to 55:45. When the weight ratio of the batch-added aromatic vinyl-based monomer and the continuously added aromatic vinyl-based monomer falls within the above range, harmony of them with a vinyl cyan-based monomer, an increasing amount of which may be involved in polymerization as the polymerization time elapses, may be implemented, and thus a copolymer having a consistent composition throughout polymerization may be prepared.

Step 3) Termination of Polymerization

After step 2), the polymerization may be terminated when a polymerization conversion rate is 95% or more.

When the polymerization is terminated at the above-described point of time, further polymerization and aging processes may be performed after the continuous addition of an aromatic vinyl-based monomer is terminated, and thus an aromatic vinyl-based monomer continuously added at the relatively late point of time may be sufficiently involved in polymerization to suppress the formation of an oligomer.

Consequently, a copolymer having a consistent composition throughout polymerization may be prepared.

The method of preparing a copolymer according to an embodiment of the present invention is preferably performed by suspension polymerization.

A copolymer prepared by the method according to an embodiment of the present invention may have a standard deviation for a vinyl cyan-based unit composition of 0.5 or less.

In this case, specifically, the standard deviation may be obtained by measuring an amount of a vinyl cyan-based unit contained in each of the copolymers obtained when a polymerization conversion rate is 3%, 13%, 20%, 30%, 45%, 60%, 80%, 85%, 90%, 92%, and 95% and then calculating a standard deviation thereof.

A copolymer prepared by the method according to an embodiment of the present invention may have a weight average molecular weight of 300,000 to 400,000 g/mol or 320,000 to 380,000 g/mol, and preferably has a weight average molecular weight of 320,000 to 380,000 g/mol.

When the weight average molecular weight of the copolymer falls within the above range, a copolymer with excellent mechanical properties and excellent processability may be prepared.

BEST MODE

Hereinafter, the present invention will be described in detail with reference to embodiments so that those skilled in the art can easily carry out the present invention. However, the present invention may be implemented in several different forms, and therefore, is not limited to embodiments described herein.

<Preparation of Copolymer>

Example 1

140 parts by weight of ion exchanged water, 40 parts by weight of styrene, 30 parts by weight of acrylonitrile, 0.035 part by weight of 1,1-di(t-butylperoxy)cyclohexane and 0.025 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 83%. In this case, the continuous addition was performed for a total of 245 minutes including 180 minutes at 97° C., 45 minutes while raising a temperature from 97° C. to 130° C. at a predetermined rate, and 20 minutes at 130° C.

Afterward, the continuous addition of styrene was terminated, and polymerization and aging processes were performed for 115 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Example 2

140 parts by weight of ion exchanged water, 40 parts by weight of styrene, 30 parts by weight of acrylonitrile, 0.186 part by weight of 1,1'-azobis(cyclohexane-1-carbonitrile) and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 86%. In this case, the continuous addition was performed for a total of 250 minutes including 180 minutes at 97° C., 45 minutes while raising a temperature from 97° C. to 130° C. at a predetermined rate, and 25 minutes at 130° C.

Afterward, the continuous addition of styrene was terminated, and polymerization and aging processes were performed for 110 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Example 3

140 parts by weight of ion exchanged water, 40 parts by weight of styrene, 30 parts by weight of acrylonitrile, 0.151 part by weight of 1,1-di(t-butylperoxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 88%. In this case, the continuous addition was performed for a total of 255 minutes including 180 minutes at 97° C., 45 minutes while raising a temperature from 97° C. to 130° C. at a predetermined rate, and 30 minutes at 130° C.

Afterward, the continuous addition of styrene was terminated, and polymerization and aging processes were performed for 105 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Example 4

140 parts by weight of ion exchanged water, 40 parts by weight of styrene, 30 parts by weight of acrylonitrile, 0.218 part by weight of 1,1-di(t-butylperoxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 89%. In this case, the continuous addition was performed for a total of 260 minutes including 180 minutes at 97° C., 45 minutes while raising a temperature from 97° C. to 130° C. at a predetermined rate, and 35 minutes at 130° C.

Afterward, the continuous addition of styrene was terminated, and polymerization and aging processes were performed for 100 minutes. Then, when a polymerization conversion rate reached 98%, the polymerization was terminated. Subsequently, formic acid was added to the reactor in such a way that the pH of a polymerization slurry was 2.5, and washing, dehydration, and drying processes were then performed to prepare a bead-type copolymer.

Example 5

140 parts by weight of ion exchanged water, 40 parts by weight of styrene, 30 parts by weight of acrylonitrile, 0.14 part by weight of 1,1'-azobis(cyclohexane-1-carbonitrile) and 0.02 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 92° C., and polymerization was then performed while continuously adding 30 parts by weight of styrene at a predetermined rate from the time point where a polymerization conversion rate reached 5% to the time point where a polymerization conversion rate reached 81%. In this case, the continuous addition was performed for a total of 240 minutes including 180 minutes at 92° C., 50 minutes while raising a temperature from 92° C. to 130° C. at a predetermined rate, and 10 minutes at 130° C.

Afterward, the continuous addition of styrene was terminated, and polymerization and aging processes were performed for 120 minutes. Then, when a polymerization conversion rate reached 96%, the polymerization was terminated. Subsequently, formic acid was added to the reactor in such a way that the pH of a polymerization slurry was 2.5, and washing, dehydration, and drying processes were then performed to prepare a bead-type copolymer.

Example 6

140 parts by weight of ion exchanged water, 40 parts by weight of styrene, 30 parts by weight of acrylonitrile, 0.14 part by weight of 1,1'-azobis(cyclohexane-1-carbonitrile) and 0.02 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 92° C., and polymerization was then performed while continuously adding 30 parts by weight of styrene at a predetermined rate from the time point where a polymerization conversion rate reached 5% to the time point where a polymerization conversion rate reached 83%. In this case, the continuous addition was performed for a total of 245 minutes including 180 minutes at 92° C., 45 minutes while raising a temperature from 92° C. to 130° C. at a predetermined rate, and 20 minutes at 130° C.

Afterward, the continuous addition of styrene was terminated, and polymerization and aging processes were performed for 115 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Example 7

140 parts by weight of ion exchanged water, 40 parts by weight of styrene, 30 parts by weight of acrylonitrile, 0.14 part by weight of 1,1'-azobis(cyclohexane-1-carbonitrile) and 0.02 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 92° C., and polymerization was then performed while continuously adding 30 parts by weight of styrene at a predetermined rate from the time point where a polymerization conversion rate reached 5% to the time point where a polymerization conversion rate reached 86%. In this case, the continuous addition was performed for a total of 250 minutes including 180 minutes at 92° C., 50 minutes while raising a temperature from 92° C. to 130° C. at a predetermined rate, and 20 minutes at 130° C.

Afterward, the continuous addition of styrene was terminated, and polymerization and aging processes were performed for 110 minutes. Then, when a polymerization conversion rate reached 96%, the polymerization was terminated. Subsequently, formic acid was added to the reactor in such a way that the pH of a polymerization slurry was 2.5, and washing, dehydration, and drying processes were then performed to prepare a bead-type copolymer.

Example 8

140 parts by weight of ion exchanged water, 40 parts by weight of styrene, 30 parts by weight of acrylonitrile, 0.14 part by weight of 1,1'-azobis(cyclohexane-1-carbonitrile) and 0.02 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 92° C., and polymerization was then performed while continuously adding 30 parts by weight of styrene at a predetermined rate from the time point where a polymerization conversion rate reached 5% to the time point where a polymerization conversion rate reached 88%. In this case, the continuous addition was performed for a total of 255 minutes including 180 minutes at 92° C., 50 minutes while raising a temperature from 92° C. to 130° C. at a predetermined rate, and 25 minutes at 130° C.

Afterward, the continuous addition of styrene was terminated, and polymerization and aging processes were performed for 105 minutes. Then, when a polymerization conversion rate reached 96%, the polymerization was terminated. Subsequently, formic acid was added to the reactor in such a way that the pH of a polymerization slurry was 2.5, and washing, dehydration, and drying processes were then performed to prepare a bead-type copolymer.

Example 9

140 parts by weight of ion exchanged water, 40 parts by weight of styrene, 30 parts by weight of acrylonitrile, 0.14 part by weight of 1,1'-azobis(cyclohexane-1-carbonitrile) and 0.02 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 92° C., and polymerization was then performed while continuously adding 30 parts by weight of styrene at a predetermined rate from the time point where a polymerization conversion rate reached 5% to the time point where a polymerization conversion rate reached 89%. In this case, the continuous addition was performed for a total of 260 minutes including 180 minutes at 92° C., 50 minutes while raising a temperature from 92° C. to 130° C. at a predetermined rate, and 30 minutes at 130° C.

Afterward, the continuous addition of styrene was terminated, and polymerization and aging processes were performed for 100 minutes. Then, when a polymerization conversion rate reached 96%, the polymerization was terminated. Subsequently, formic acid was added to the reactor in such a way that the pH of a polymerization slurry was 2.5, and washing, dehydration, and drying processes were then performed to prepare a bead-type copolymer.

Comparative Example 1

140 parts by weight of ion exchanged water, 40 parts by weight of styrene, 30 parts by weight of acrylonitrile, 0.218 part by weight of 1,1-di(t-butylperoxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 76%. In this case, the continuous addition was performed for a total of 240 minutes including 180 minutes at 97° C., 45 minutes while raising a temperature from 97° C. to 130° C. at a predetermined rate, and 15 minutes at 130° C.

Afterward, the continuous addition of styrene was terminated, and polymerization and aging processes were performed for 120 minutes. Then, when a polymerization conversion rate reached 96%, the polymerization was terminated. Subsequently, formic acid was added to the reactor in such a way that the pH of a polymerization slurry was 2.5, and washing, dehydration, and drying processes were then performed to prepare a bead-type copolymer.

Comparative Example 2

140 parts by weight of ion exchanged water, 40 parts by weight of styrene, 30 parts by weight of acrylonitrile, 0.218 part by weight of 1,1-di(t-butyl peroxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 94%. In this case, the continuous addition was performed for a total of 280 minutes including 180 minutes at 97° C., 45 minutes while raising a temperature from 97° C. to 130° C. at a predetermined rate, and 55 minutes at 130° C.

Afterward, the continuous addition of styrene was terminated, and polymerization and aging processes were performed for 80 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Comparative Example 3

140 parts by weight of ion exchanged water, 40 parts by weight of styrene, 30 parts by weight of acrylonitrile, 0.218 part by weight of 1,1-di(t-butyl peroxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 89%. In this case, the continuous addition was performed at 97° C. for 280 minutes.

Afterward, the continuous addition of styrene was terminated, and polymerization and aging processes were performed for 80 minutes. Then, when a polymerization conversion rate reached 91%, the polymerization was terminated. Subsequently, formic acid was added to the reactor in such a way that the pH of a polymerization slurry was 2.5, and washing, dehydration, and drying processes were then performed to prepare a bead-type copolymer.

Comparative Example 4

140 parts by weight of ion exchanged water, 40 parts by weight of styrene, 30 parts by weight of acrylonitrile, 0.218 part by weight of 1,1-di(t-butyl peroxy)cyclohexane and 0.017 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 130° C., and polymerization was then performed while continuously adding 30 parts by weight of styrene at a predetermined rate from the time point where a polymerization conversion rate reached 5% to the time point where a polymerization conversion rate reached 89%. In this case, the continuous addition was performed at 130° C. for 130 minutes.

Afterward, the continuous addition of styrene was terminated, and polymerization and aging processes were performed for 230 minutes. Then, when a polymerization conversion rate reached 92%, the polymerization was terminated. Subsequently, formic acid was added to the reactor in such a way that the pH of a polymerization slurry was 2.5, and washing, dehydration, and drying processes were then performed to prepare a bead-type copolymer.

Comparative Example 5

140 parts by weight of ion exchanged water, 40 parts by weight of styrene, 30 parts by weight of acrylonitrile, 0.035 part by weight of 1,1-di(t-butyl peroxy)cyclohexane and 0.025 part by weight of dicumyl peroxide as initiators, 1.3 parts by weight of tricalcium phosphate as a suspending agent, and 0.08 part by weight of t-dodecyl mercaptan as a molecular weight controlling agent were added to a reactor. The temperature inside the reactor was raised to 97° C., and polymerization was then performed while continuously adding 30 parts by weight of styrene at a predetermined rate from the time point where a polymerization conversion rate reached 5% to the time point where a polymerization conversion rate reached 92%. In this case, the continuous addition was performed for 245 minutes while raising a temperature from 97° C. to 130° C. at a predetermined rate.

Afterward, the continuous addition of styrene was terminated, and polymerization and aging processes were performed for 115 minutes. Then, when a polymerization conversion rate reached 97%, the polymerization was terminated. Subsequently, formic acid was added to the reactor in such a way that the pH of a polymerization slurry was 2.5, and washing, dehydration, and drying processes were then performed to prepare a bead-type copolymer.

Experimental Example 1

A difference in amount of units derived from an acrylonitrile contained in a final copolymer product and an intermediate copolymer product prepared in each of Examples and Comparative Examples and a standard deviation therefor were calculated by methods as described below, and results thereof are shown in Table 1 below.

①  Difference in Content of Units Derived from Acrylonitrile:

A content of units derived from an acrylonitrile in a final copolymer product and a maximum content of units derived from acrylonitrile in intermediate copolymer products obtained at polymerization conversion rate intervals listed in Table 1 were measured, and a difference between the two values was then calculated.

② Standard Deviation for Units Derived from Acrylonitrile:

A content of units derived from an acrylonitrile in each of the copolymers obtained when a polymerization conversion rate was 3%, 13%, 20%, 30%, 45%, 60%, 80%, 85%, 90%, 92%, and 95% was measured, and a standard deviation therefor was calculated.

Experimental Example 2

Each of the copolymers according to Examples and Comparative Examples was put into an MI instrument (trade name: Melt Indexer F-B01, manufactured by TOYO SEIKI SEISAKU-SHO, LTD.) and retained under a condition of 250° C./10 kg for 10 minutes to prepare a specimen. Transparency of the specimen was measured by a method as described below, and a result thereof is shown in Table 1 below. In addition, transparencies of Example 4 and Comparative Example 1 are compared in FIG. 1.

③ Transparency: The Specimen was Placed on a Black Paper, and Transparency Thereof was Observed Through Visual Observation.

TABLE 1

| Classification | End point of continuous addition | Polymerization conversion rate (%) | | | | Standard deviation | Transparency |
| --- | --- | --- | --- | --- | --- | --- | --- |
| | | 0~25 | 25~50 | 50~75 | 75~98 | | |
| Example 1 | 83 | 1.02 | 1.04 | 0.81 | 0.56 | 0.49 | o |
| Example 2 | 86 | 0.58 | 0.51 | 0.33 | 0.56 | 0.33 | o |
| Example 3 | 88 | 0.62 | 0.62 | 0.06 | 0.35 | 0.26 | o |
| Example 4 | 89 | 0.10 | 0.11 | 0.25 | 0.36 | 0.14 | o |
| Example 5 | 81 | 1.20 | 1.13 | 0.22 | 0.10 | 0.50 | o |
| Example 6 | 83 | 1.06 | 0.82 | 0.81 | 0.41 | 0.46 | o |
| Example 7 | 86 | 0.40 | 0.44 | 0.56 | 0.67 | 0.41 | o |
| Example 8 | 88 | 0.62 | 0.45 | 0.22 | 0.07 | 0.29 | o |
| Example 9 | 89 | 0.52 | 0.25 | 0.15 | 0.07 | 0.22 | o |
| Comparative Example 1 | 76 | 1.80 | 1.65 | 0.86 | 0.32 | 0.71 | o |
| Comparative Example 2 | 94 | 2.39 | 4.22 | 3.97 | 2.56 | 1.64 | x |
| Comparative Example 3 | 89 | 0.96 | 0.96 | 0.50 | 0.79 | 0.60 | x |
| Comparative Example 4 | 89 | 1.30 | 3.63 | 5.24 | 0.84 | 1.87 | x |
| Comparative Example 5 | 92 | 1.98 | 3.35 | 2.88 | 1.68 | 0.93 | x |

Referring to Table 1, in the case of Example 1 to Example 9, a difference between the content of units derived from an acrylonitrile in a final copolymer product and a maximum content of units derived from an acrylonitrile in an intermediate copolymer product did not show any specific pattern of tendency depending on the time point in a polymerization conversion rate interval in which an intermediate product was obtained. However, it can be confirmed that, as the end point of continuous addition of styrene was delayed, a standard deviation for an acrylonitrile composition was reduced, and improved transparency was exhibited. Meanwhile, the copolymers according to Comparative Example 1 and Comparative Example 2, in which the continuous addition of styrene was terminated when a polymerization conversion rate was 76% and 94%, respectively, exhibited not only a large standard deviation for acrylonitrile but also poor transparency.

The copolymers according to Comparative Example 3 and Comparative Example 4, in which styrene was continuously added only at 97° C. and 130° C., respectively, even though the end point of the continuous addition was the same as Example 4, exhibited not only a large standard deviation for acrylonitrile but also poor transparency. Also, in the case of Comparative Example 5 in which styrene was continuously added while raising a temperature from 97° C. to 130° C. at a predetermined rate, polymerization proceeded quickly while there was a large amount of acrylonitrile contained in a reactor at the early stage of polymerization because a temperature was continuously raised to a temperature higher than a general polymerization temperature. In addition, as a temperature became close to 130° C., polymerization proceeded while there was a small amount of acrylonitrile contained in a reactor. Consequently, in the case of Comparative Example 5, a copolymer with a large standard deviation for acrylonitrile and poor transparency was prepared.

Figure 1:
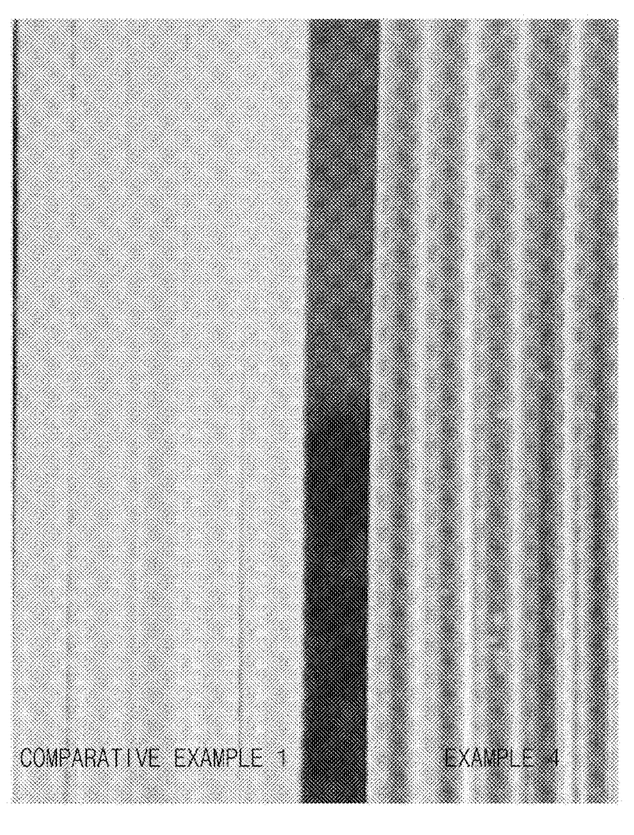
FIG. 1 is an image in which transparencies of the specimens according to Example 4 and Comparative Example 1 are compared.

Meanwhile, referring to FIG. 1, it can be confirmed that the black color of the paper located behind the copolymer according to Example 4 was clearly visible, whereas the black color of the paper located behind the copolymer according to Comparative Example 1 was not visible.

It can be confirmed from the above results that only when both of the end point of the continuous addition of styrene and the temperature condition of the continuous addition are satisfied, a copolymer with a consistent composition and excellent transparency may be prepared.

The invention claimed is:

1. A method of preparing a copolymer comprising:
   1) initiating polymerization by batch-adding an aromatic vinyl-based monomer and a vinyl cyan-based monomer to a reactor; and
   2) performing polymerization by continuously adding an aromatic vinyl-based monomer to the reactor at a predetermined rate after the initiation of polymerization,
   wherein the continuous addition of the aromatic vinyl-based monomer is initiated when a polymerization conversion rate is 10% or less and terminated when a polymerization conversion rate is between 80 and 90% based on a total weight of monomers, and
   step 2) comprises a first temperature phase and a second temperature phase, each of which maintains a constant temperature,
   wherein a temperature of the second temperature phase is higher than that of the first temperature phase, and
   wherein the temperature of the second temperature phase is 120 to 140° C.

2. The method of claim 1, wherein step 2) proceeds by continuously adding the aromatic vinyl-based monomer at a predetermined rate in the first temperature phase to perform polymerization and then continuously adding the aromatic vinyl-based monomer at a predetermined rate in the second temperature phase to perform polymerization.

3. The method of claim 1, wherein the temperature of the first temperature phase is 90 to 110° C.

4. The method of claim 1, wherein a ratio of the duration of the first temperature phase and the duration of the second temperature phase is 55:45 to 95:5.

5. The method of claim 1, wherein a weight ratio of the batch-added aromatic vinyl-based monomer and the continuously added aromatic vinyl-based monomer is 85:15 to 50:50.

6. The method of claim 1, wherein a weight ratio of the aromatic vinyl-based monomer and the vinyl cyan-based monomer added in the method of preparing a copolymer is 80:20 to 60:40.

7. The method of claim 1, further comprising, after step 2):
   3) terminating the polymerization when a polymerization conversion rate is 95% or more.

8. The method of claim 1, wherein the polymerization is performed by suspension polymerization.

9. The method of claim 1, wherein a standard deviation of the wt % of vinyl-cyan based units in the copolymer during the polymerization of step 2) is 0.5 or less.

10. A method of preparing a copolymer comprising:
    1) initiating polymerization by batch-adding an aromatic vinyl-based monomer and a vinyl cyan-based monomer to a reactor; and
    2) performing polymerization by continuously adding an aromatic vinyl-based monomer to the reactor at a predetermined rate after the initiation of polymerization,
    wherein the continuous addition of the aromatic vinyl-based monomer is initiated when a polymerization conversion rate is 10% or less and terminated when a polymerization conversion rate is between 80 and 90% based on a total weight of monomers, and
    step 2) comprises a first temperature phase and a second temperature phase, each of which maintains a constant temperature,
    wherein a temperature of the second temperature phase is higher than that of the first temperature phase, and
    wherein a ratio of the duration of the first temperature phase and the duration of the second temperature phase is 55:45 to 95:5.

11. A method of preparing a copolymer comprising:
    1) initiating polymerization by batch-adding an aromatic vinyl-based monomer and a vinyl cyan-based monomer to a reactor; and
    2) performing polymerization by continuously adding an aromatic vinyl-based monomer to the reactor at a predetermined rate after the initiation of polymerization,
    wherein the continuous addition of the aromatic vinyl-based monomer is initiated when a polymerization conversion rate is 10% or less and terminated when a polymerization conversion rate is between 80 and 90% based on a total weight of monomers, and
    step 2) comprises a first temperature phase and a second temperature phase, each of which maintains a constant temperature,
    wherein a temperature of the second temperature phase is higher than that of the first temperature phase, and
    wherein a weight ratio of the batch-added aromatic vinyl-based monomer and the continuously added aromatic vinyl-based monomer is 85:15 to 50:50.

* * * * *